US012667047B2

(12) United States Patent
Baker

(10) Patent No.: US 12,667,047 B2
(45) Date of Patent: Jun. 30, 2026

(54) LAWN CARE VEHICLE WITH FRONT DRIVE CASTER WHEELS

(71) Applicant: Husqvarna AB, Huskvarna (SE)

(72) Inventor: David Baker, Fort Lawn, SC (US)

(73) Assignee: HUSQVARNA AB, Huskvarna (SE)

( * ) Notice: Subject to any disclaimer, the term of this patent is extended or adjusted under 35 U.S.C. 154(b) by 922 days.

(21) Appl. No.: 17/619,146

(22) PCT Filed: Oct. 30, 2019

(86) PCT No.: PCT/IB2019/059315
§ 371 (c)(1),
(2) Date: Dec. 14, 2021

(87) PCT Pub. No.: WO2021/084307
PCT Pub. Date: May 6, 2021

(65) Prior Publication Data
US 2022/0369549 A1 Nov. 24, 2022

(51) Int. Cl.
*A01D 34/82* (2006.01)
*B60B 33/02* (2006.01)

(52) U.S. Cl.
CPC ............ *A01D 34/82* (2013.01); *B60B 33/021* (2013.01)

(58) Field of Classification Search
CPC ........ A01D 34/68; A01D 34/69; A01D 34/82; A01D 34/6806; A01D 34/6825;
(Continued)

(56) References Cited

U.S. PATENT DOCUMENTS 2,695,486 A 11/1954 Hospe
2,809,705 A * 10/1957 Seweil ................... A01D 34/63
180/19.3
(Continued)

FOREIGN PATENT DOCUMENTS

EP 0367891 A1 5/1990
EP 1943894 A2 7/2008

OTHER PUBLICATIONS

International Search Report and Written Opinion for International Application No. PCT/IB2019/059315 mailed Aug. 31, 2020.

*Primary Examiner* — Joseph M Rocca
*Assistant Examiner* — Robert E Pezzuto
(74) *Attorney, Agent, or Firm* — Burr & Forman

(57) ABSTRACT

A riding lawn care vehicle may include a frame, a steering assembly, caster wheels and a drive assembly. At least a first drive wheel and a second drive wheel of the riding lawn care vehicle are attachable to the frame. The steering assembly is configured to facilitate turning of the riding lawn care vehicle based on drive speed control of the first and second drive wheels. The caster wheels are configured to support unpowered rotation about a wheel axis that extends substantially parallel to the ground and rotation about a spindle axis that is substantially perpendicular to the ground. The drive assembly is configured to be selectively placed in a disengaged state in which rotation about the spindle axis and the wheel axis is uninhibited, and an engaged state in which the caster wheels are at least partially inhibited with respect to rotation about both the wheel axis and the spindle axis.

17 Claims, 8 Drawing Sheets

(58) Field of Classification Search
CPC ... A01D 34/6837; B60B 33/021; B60L 50/66;
B62D 11/24
See application file for complete search history.

(56) References Cited

U.S. PATENT DOCUMENTS

| | | | |
|---|---|---|---|
| 3,754,616 A * | 8/1973 | Watland ............. | A01D 34/6806 |
| | | | 180/343 |
| 4,237,991 A * | 12/1980 | Schlapper ............. | A01D 34/69 |
| | | | 180/343 |
| 4,422,515 A | 12/1983 | Loveless | |
| 5,983,614 A | 11/1999 | Hancock et al. | |
| 6,273,212 B1 | 8/2001 | Husted et al. | |
| 7,581,604 B2 | 9/2009 | Torita | |
| 8,267,205 B2 * | 9/2012 | Ishii ........................ | B60L 50/66 |
| | | | 180/65.6 |
| 2006/0175098 A1 * | 8/2006 | Sutherland ............. | B62D 11/24 |
| | | | 180/6.24 |
| 2012/0167537 A1 | 7/2012 | Corriher | |
| 2018/0093708 A1 | 4/2018 | Soldan | |

* cited by examiner

LAWN CARE VEHICLE WITH FRONT DRIVE CASTER WHEELS

TECHNICAL FIELD

Example embodiments generally relate to lawn care vehicles and, more particularly, to a front drive for caster wheels of riding lawn care vehicles.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

Some riding lawn mowers have been provided with very short (e.g., near zero) turning radiuses. Such mowers have employed separate steering levers that each allow individual control of a corresponding drive wheel on the same side of the mower. The drive wheels are generally rear wheels, and wheels at the front of the mower tend to be caster wheels that can freely rotate about an axis perpendicular to the ground in order to support movement in any direction, and the tight turning radiuses that can be achieved with such mowers.

This operational paradigm (i.e., having powered rear wheels and unpowered front caster wheels) generally performs quite well in most situations. However, there are a few situations where the unpowered front caster wheels do not contribute positively to the operation of the mower. For example, the front caster wheels themselves may not be stable on hills. In this regard, such instability may be experienced when mowing perpendicular to the slope of a steep hill, or when going straight up or down steep hills. When attempting to back up a steep hill, weight may transfer to the front wheels (i.e., the caster wheels), and the unit may lose traction. When descending steep hills, the user may need to pull the steering levers rearward (thereby applying drive power in the rearward direction) in order to slow the decent of the mower down the hill. In these cases, the rearward drive power acts as a brake during the descent and the front caster wheels do not contribute positively to the control of the mower. Thus, it may be desirable to provide a capability for improved contribution to the stability of the front caster wheels (and perhaps also the mower in general) such as by lessening or even stopping rotation of the front caster wheels.

BRIEF SUMMARY OF SOME EXAMPLES

Some example embodiments of the present invention provide the ability to engage a drive assembly to the front caster wheels. This arrangement, as will be discussed in greater detail below, tends to provide a more stability when mowing perpendicular to a slope or when transiting up or down a steep slope and may result in improved operator experience during employment of the riding lawn care vehicle.

In one example embodiment, a riding lawn care vehicle is provided. The riding lawn care vehicle may include a frame, a steering assembly, caster wheels and a drive assembly. At least a first drive wheel and a second drive wheel of the riding lawn care vehicle are attachable to the frame. The steering assembly is configured to facilitate turning of the riding lawn care vehicle based on drive speed control of the first and second drive wheels. The caster wheels are configured to support unpowered rotation about a wheel axis that extends substantially parallel to the ground and rotation about a spindle axis that is substantially perpendicular to the ground. The drive assembly is configured to be selectively placed in a disengaged state in which rotation about the spindle axis and the wheel axis is uninhibited, and an engaged state in which the caster wheels are at least partially inhibited with respect to rotation about both the wheel axis and the spindle axis.

In another example embodiment, a drive assembly of a riding lawn care vehicle is provided. The riding lawn care vehicle may include caster wheels and first and second drive wheels operably coupled to a frame. The riding lawn care vehicle may further include a steering assembly configured to facilitate turning of the riding lawn care vehicle based on drive speed control of the first and second drive wheels. The caster wheels may be configured to support unpowered rotation about a wheel axis that extends substantially parallel to the ground and rotation about a spindle axis that is substantially perpendicular to the ground. The drive assembly may include a friction drive assembly configured to be selectively placed in a disengaged state in which rotation about the spindle axis and the wheel axis is uninhibited, and an engaged state in which the caster wheels are at least partially inhibited with respect to rotation about both the wheel axis and the spindle axis.

Some example embodiments may improve an operator's ability to control or operate a lawn care vehicle for operations on hills. The user experience associated with operating the riding lawn care vehicle may therefore be improved.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

Figure 4A:
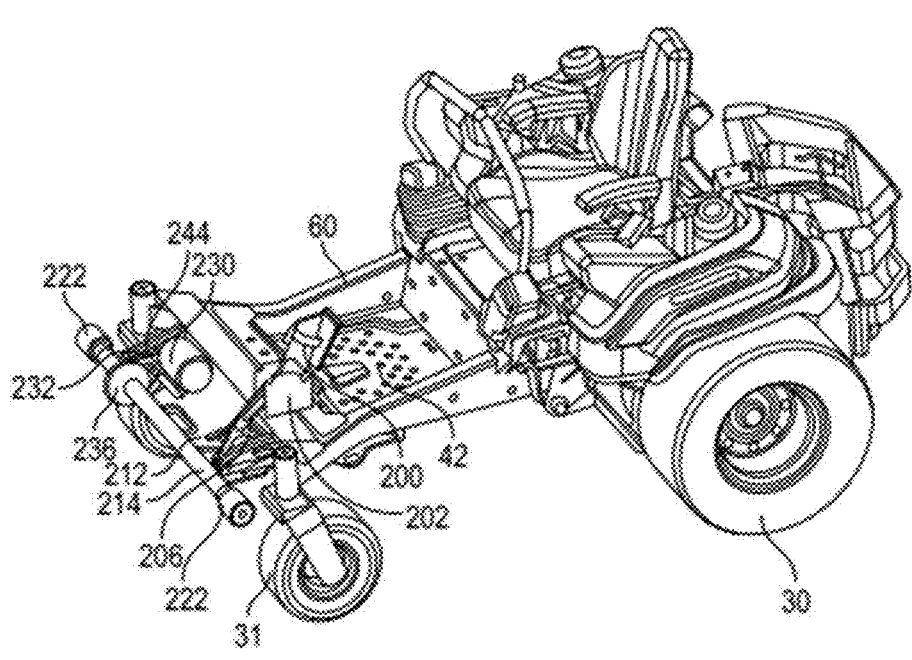
Figure 4B:
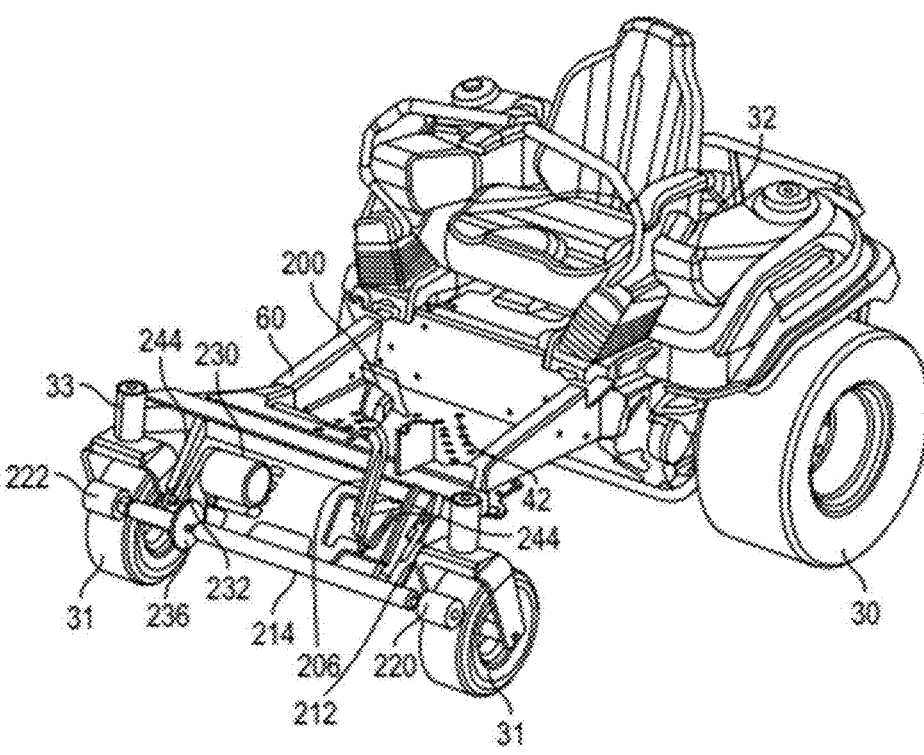
Figure 5A:
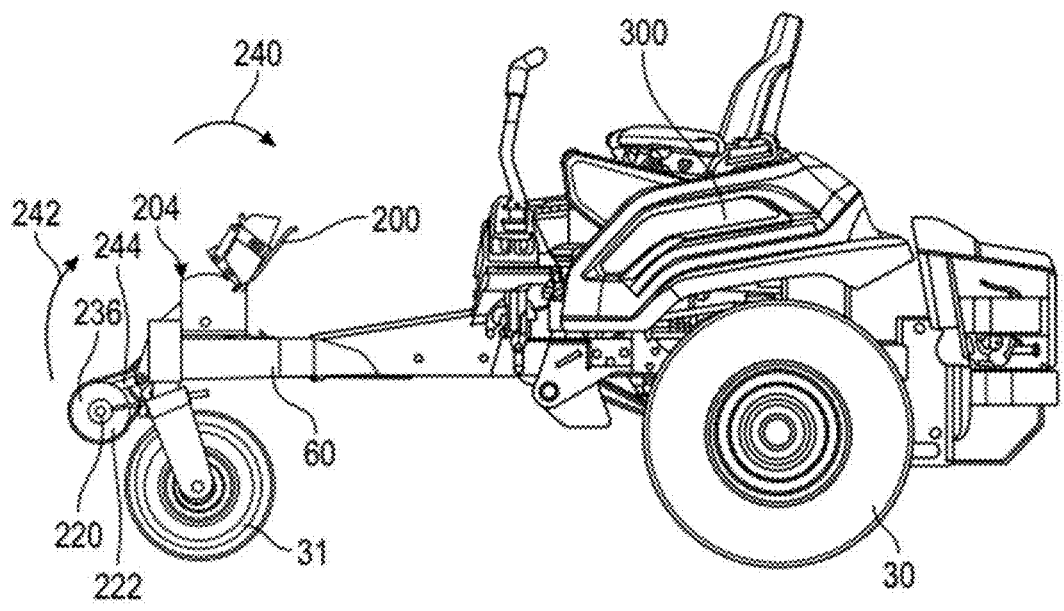
Figure 5B:
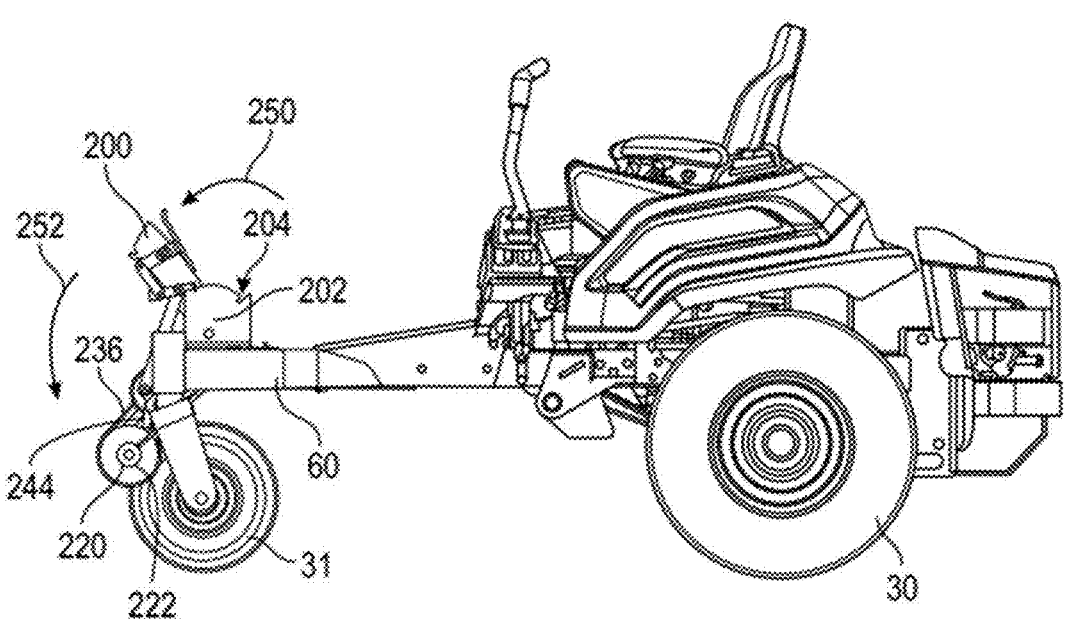
Figure 6A:
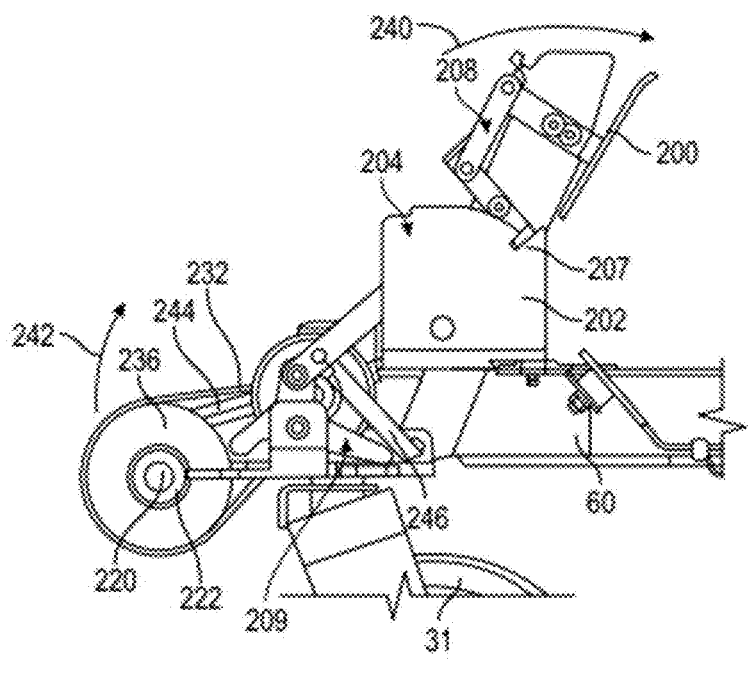
Figure 6B:
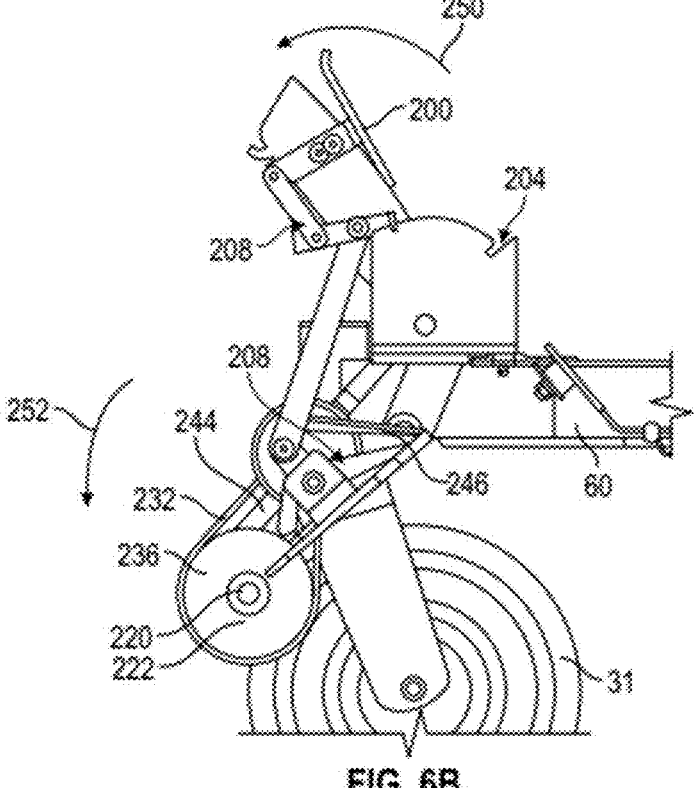
Figure 7:
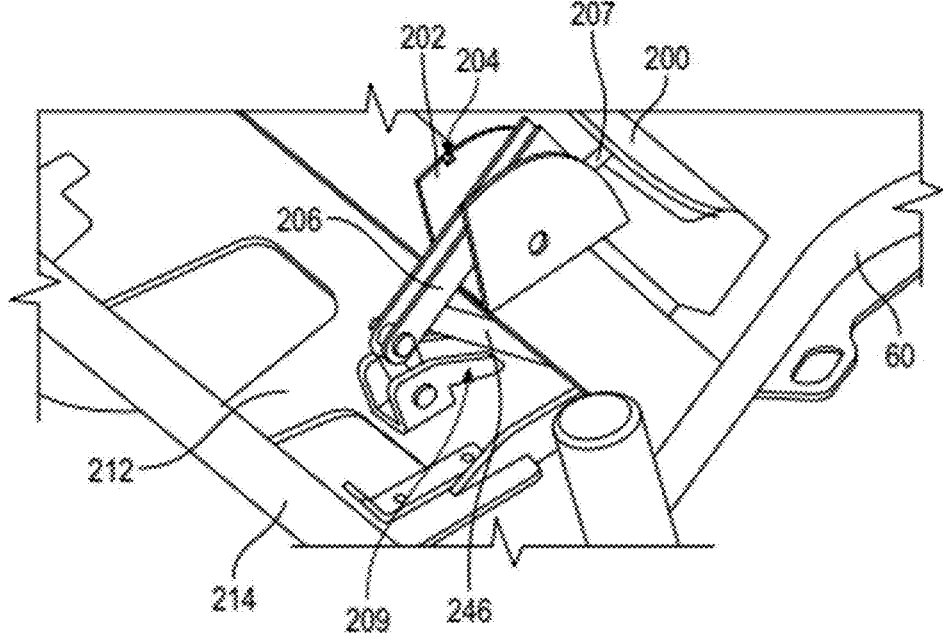

FIG. 4, which is defined by FIGS. 4A and 4B, illustrates perspective views of the riding lawn care vehicle having a front drive assembly in a disengaged state and engaged state, respectively, in accordance with an example embodiment;

FIG. 5, which is defined by FIGS. 5A and 5B, illustrates left side views of the riding lawn care vehicle having the front drive assembly in the disengaged state and engaged state, respectively, in accordance with an example embodiment;

FIG. 6, which is defined by FIGS. 6A and 6B, illustrates a closer view of the left side views of the riding lawn care vehicle having the front drive assembly in the disengaged state and engaged state, respectively, in accordance with an example embodiment; and FIG. 7 illustrates a perspective view of the drive assembly of an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

Some example embodiments may improve the ability of an operator to control operation of riding lawn care vehicles on hills. However, the concepts described herein for improving control of the riding lawn care vehicle may also have benefits in other situations as well. In an example embodiment, a caster wheel drive assembly (or simply a drive assembly) may be selectably either engaged or disengaged to provide positive engagement with the caster wheels when engaged and remove such engagement when disengaged. The caster wheel drive assembly may include or be embodied as a friction drive assembly that can be rotated into or out of contact with the caster wheels. When engaged (or in an engaged state), the caster wheel drive assembly may be configured to rotate the caster wheels at a speed that matches the speed over ground being applied by the drive wheels (e.g., the rear wheels). This also means that the caster wheel drive assembly, when engaged while no power is applied, actually provide a braking function to enhance braking capabilities for the vehicle. The engaged state also holds the caster wheels in a generally fixed (e.g., fixed but with the potential for some amount of play to be designed in) orientation directed forward. Meanwhile, when disengaged, the caster wheels are free to operate normally in the way they typically operate in the absence of the caster wheel drive assembly of an example embodiment.

Figure 1A:
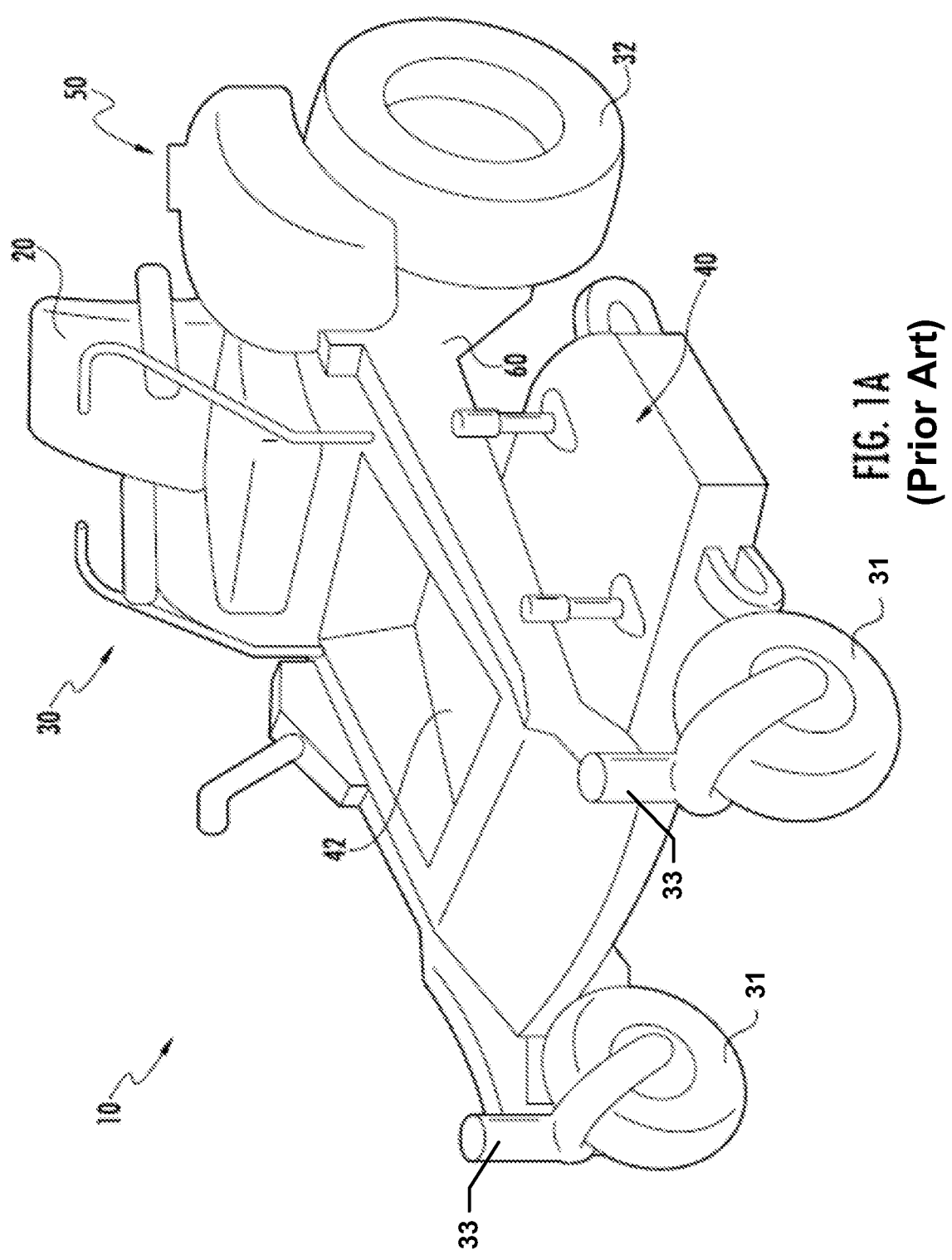
FIG. 1A illustrates a perspective view of a conventional riding lawn care vehicle.
Figure 1B:
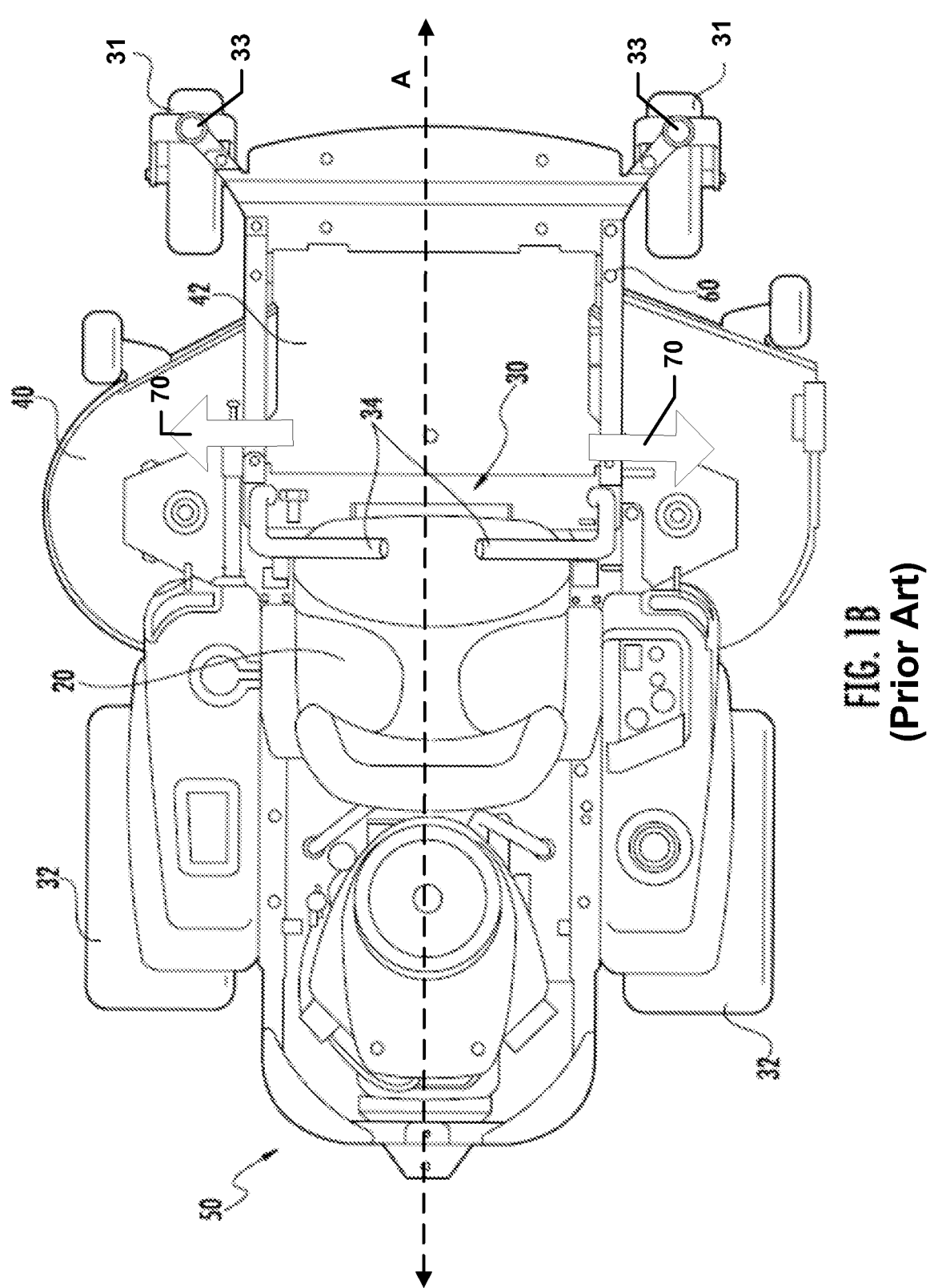
FIG. 1B illustrates a top view of the riding lawn care vehicle of FIG. 1A.

FIG. 1, which includes FIGS. 1A and 1B, illustrates a riding lawn care vehicle 10 according to an example embodiment. FIG. 1A illustrates a perspective view of the riding lawn care vehicle 10, and FIG. 1B illustrates a top view of the riding lawn care vehicle 10 according to an example embodiment. In some embodiments, the riding lawn care vehicle 10 may include a seat 20 that may be disposed at a center, rear, or front portion of the riding lawn care vehicle 10. The riding lawn care vehicle 10 may also include a steering assembly 30 (e.g., a set of steering levers or the like) functionally connected to wheels 31 and/or 32 of the riding lawn care vehicle 10 to allow the operator to steer the riding lawn care vehicle 10.

Figure 2:
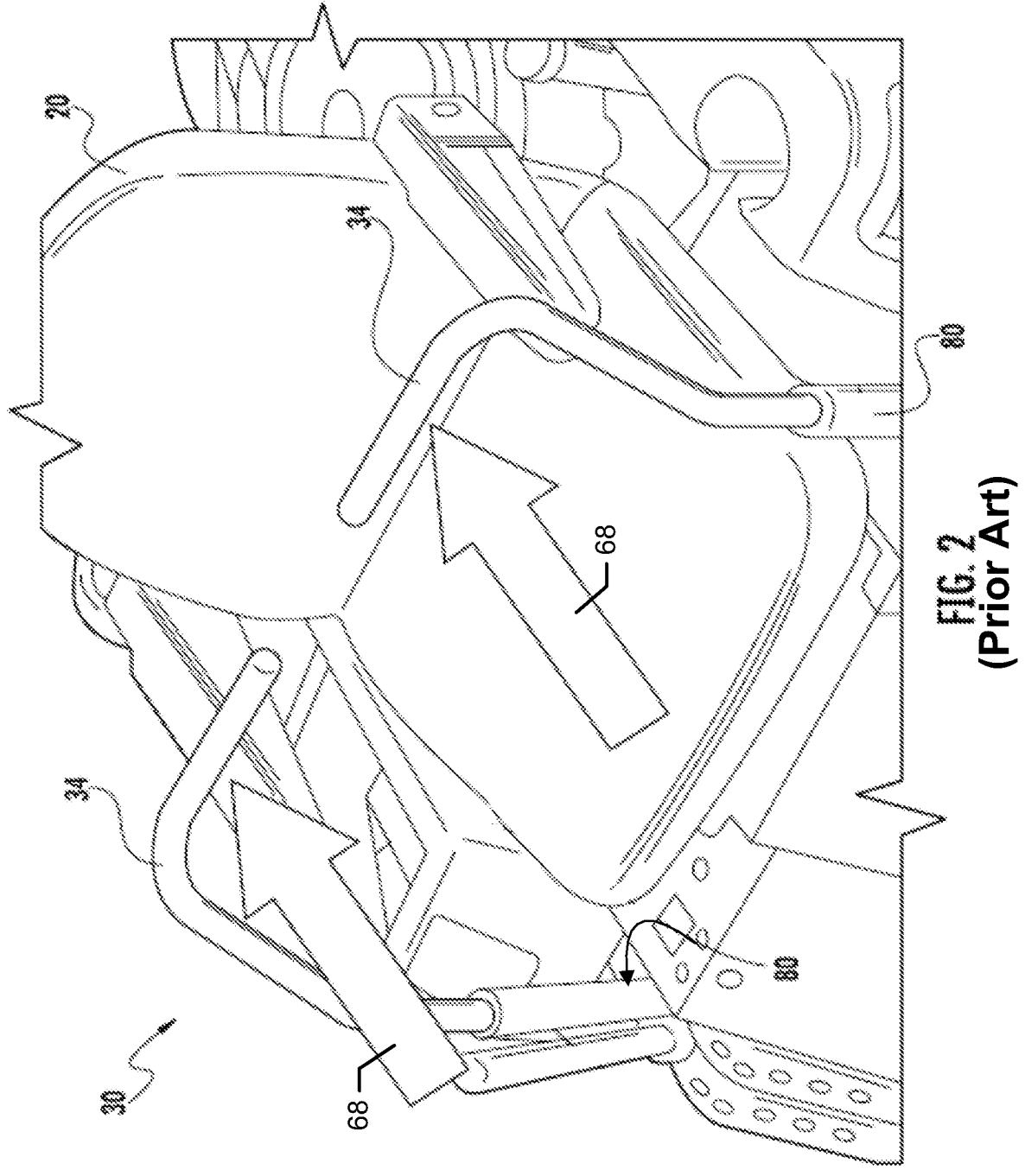
FIG. 2 illustrates a perspective view of the steering assembly of the riding lawn care vehicle of FIGS. 1A and 1B.

FIG. 2 illustrates a perspective view of a steering assembly with steering levers positioned to be pulled back for rearward propulsion of the riding lawn care vehicle 10 of FIG. 1. Referring to FIGS. 1 and 2, the operator may sit on the seat 20, which may be disposed to the rear of the steering assembly 30 to provide input for steering of the riding lawn care vehicle 10 via the steering assembly 30. However, some models may be stand-up models that eliminate the seat 20. If the seat 20 is eliminated, the operator may stand at an operator station proximate to the steering assembly 30. In an example embodiment, the steering assembly 30 may include separately operable steering levers 34 shown specifically in FIG. 1B and FIG. 2.

The riding lawn care vehicle 10 may also include a cutting deck 40 having at least one cutting blade (e.g., three cutting blades) mounted therein. The cutting deck 40 may be positioned substantially rearward of a pair of front wheels 31 and substantially forward of a pair of rear wheels 32 in a position to enable the operator to cut grass using the cutting blade(s) when the cutting blade(s) are rotated below the cutting deck 40 when the cutting deck 40 is in a cutting position. However, in some alternative examples, the cutting deck 40 may be positioned in front of the front wheels 31. Each of the front wheels 31 may be a caster wheel that has two separate axes (e.g., each of which may be referred to as a wheel axis) about which rotation is possible. In this regard, each of the caster wheels has a wheel axle that extends parallel to the ground and about which the wheel rotates during rolling motion over the ground. The wheel axle may define the wheel axis. Each of the caster wheels also has a spindle 33 that extends substantially perpendicular to the ground. Rotation around the spindle 33 enables the caster wheels to rotate to support movement in any direction (i.e., over the 360 turn radius of the riding lawn care vehicle 10). The spindle 33 may therefore define a spindle axis.

In some embodiments, a footrest 42 may also be positioned above the cutting deck 40 forward of the seat 20 to enable the operator to rest his or her feet thereon while seated in the seat 20. In embodiments that do not include the seat 20, the footrest 42 may form the operator station from which a standing operator controls the riding lawn care vehicle 10. When operating to cut grass, the grass clippings may be captured by a collection system, mulched, or expelled from the cutting deck 40 via either a side discharge or a rear discharge.

In the pictured example embodiment, an engine 50 of the riding lawn care vehicle 10 is disposed to the rear of a seated operator. However, in other example embodiments, the engine 50 could be in different positions such as in front of or below the operator. As shown in FIG. 1, the engine 50 may be operably coupled to one or more of the wheels 31 and/or 32 to provide drive power for the riding lawn care vehicle 10. The engine 50, the steering assembly 30, the cutting deck 40, the seat 20, and other components of the riding lawn care vehicle 10 may be operably connected (directly or indirectly) to a frame 60 of the riding lawn care vehicle 10. The frame 60 may be a rigid structure configured to provide support, connectivity, and/or interoperability functions for various ones of the components of the riding lawn care vehicle 10.

In some example embodiments, the steering assembly 30 may be embodied as an assembly of metallic and/or other rigid components that may be welded, bolted, and/or otherwise attached to each other and operably coupled to the wheels of the riding lawn care vehicle 10 to which steering inputs are provided (e.g., rear wheels 32). For example, the steering assembly 30 may include or otherwise be coupled with hydraulic motors that independently power one or more drive wheels (e.g., rear wheels 32) on each respective side of the riding lawn care vehicle 10. The steering levers 34 may be operable to move forward (i.e., in a direction opposite arrow 68 in FIG. 2) and rearward (i.e., in the direction shown by arrow 68 in FIG. 2) while in the inboard position (shown in both FIGS. 1 and 2).

When a steering lever 34 is pushed forward (e.g., away from the operator an opposite the direction of arrow 68), the corresponding hydraulic motor may drive the corresponding wheel forward. When a steering lever 34 is pulled rearward (e.g., toward the operator as shown by the direction of arrows 68 in FIG. 2), the corresponding hydraulic motor may drive the corresponding wheel backward. Thus, when both steering levers 34 are pushed forward the same amount, the riding lawn care vehicle 10 travels forward in substantially a straight line because approximately the same amount of forward drive input is provided to each drive wheel. When both steering levers 34 are pulled back the same amount, the riding lawn care vehicle 10 travels backward (e.g., rearward) in substantially a straight line because approximately the same amount of rearward drive input is provided to each drive wheel. When one steering lever 34 is pushed forward and the other steering lever 34 is pulled back, the riding lawn care vehicle 10 begins to turn in a circle and/or spin. Steering right and left may be accomplished by providing uneven amounts of input to the steering levers 34. Other steering control systems may be employed in some alternative embodiments.

Although the steering levers 34 are generally moved forward (i.e., opposite the direction of the arrows 68 shown in FIG. 2) or backward (i.e., in the direction of the arrows 68 shown in FIG. 2) in any desirable combination while they are in the operating positions shown in FIGS. 1 and 2, it should be appreciated that the steering levers 34 may also be moved to an outboard position (e.g., in a non-operational state) by moving the steering levers 34 outwardly in the direction shown by arrows 70 in FIG. 1B. In this regard, although the steering levers 34 are shown in the inboard (or operational) position in FIGS. 1 and 2, the steering levers 34 may be moved in the direction of arrows 70 (i.e., outboard) relative to their inboard position and into a non-operational position. In some cases, each of the steering levers 34 may be operably coupled to respective lever mounts 80 that may pivot to enable the steering levers 34 to move outwardly (e.g., to the outboard position) or inwardly (e.g., to an inboard and/or operating position). In some embodiments, when at least one (and sometimes both) of the steering levers 34 is pivoted outwardly, brakes may be applied and the operator may easily mount or dismount the riding lawn care vehicle 10 and sit in or leave the seat 20.

Figure 3:
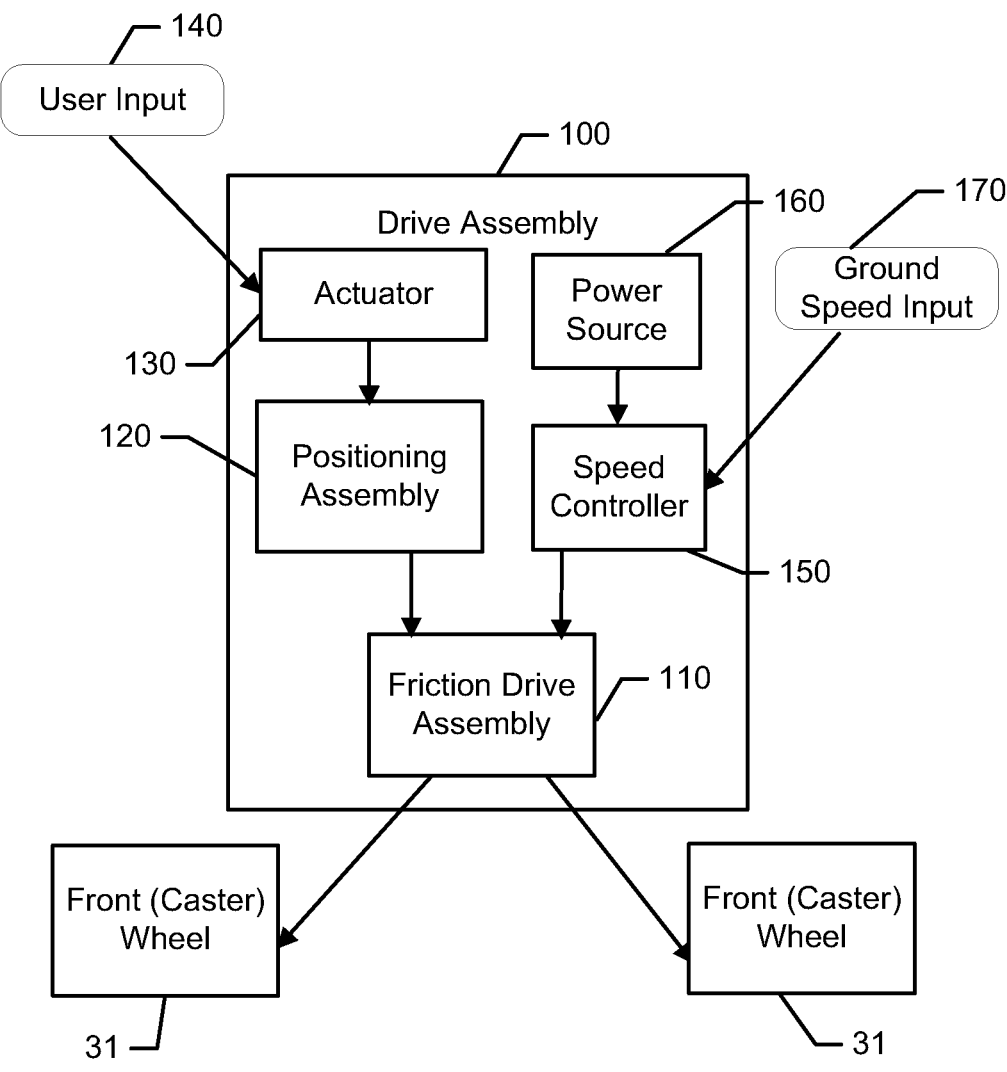
FIG. 3 illustrates a block diagram of an improved riding lawn care vehicle including a drive assembly according to an example embodiment.

FIG. 3 illustrates a block diagram of some components that can be added to the riding lawn care vehicle 10 of FIGS. 1 and 2 to provide front drive capability in accordance with an example embodiment. The components added may be operably coupled to the frame 60 (proximate to the front of the footrest 42) to interface with the front wheels 31. As shown in FIG. 3, a drive assembly 100 according to an example embodiment may be added to the riding lawn care vehicle 10. The drive assembly 100 may be referred to as a "front drive assembly" in this case, since the front wheels 31 are the caster wheels, or as a "caster wheel drive assembly." However, it is also possible that the caster wheels could be located elsewhere (e.g., at the rear or on sides of a mower) in which case the drive would not be properly characterized as a "front drive assembly." Thus, the more generic term of "drive assembly" will be used hereinafter.

As shown in FIG. 3, the drive assembly 100 includes a friction drive assembly 110 which is movable into and out of contact with each of the front wheels 31 responsive to operation of a positioning assembly 120. The position assembly 120 may be operable responsive to positioning of an actuator 130 based on a user input 140. In an example embodiment, the friction drive assembly 110 may be considered to be engaged or in an engaged state, when the friction drive assembly 110 is moved into contact with the front wheels 31. In an example embodiment, the friction drive assembly 110 may simultaneously contact both of the front wheels 31 in the engaged state. Meanwhile, when the friction drive assembly 110 is moved such that there is no contact with the front wheels 31 (i.e., moved to be spaced apart from the front wheels 31), then the friction drive assembly 110 may be considered to be disengaged or in the disengaged state.

The positioning assembly 120 may, in some cases, be defined by a pivot structure that is configured to rotate about an axis (responsive to operation of the actuator 130) in order to move between the engaged and disengaged states. In some cases, the disengaged state may be reached by lifting the friction drive assembly 110 away from the front wheels 31. This arrangement enables gravity to assist with maintaining friction and engagement between the friction drive assembly 110 and the front wheels 31 in the engaged state. Thus, the weight of the friction drive assembly 110 (and perhaps also some or all of the weight of the positioning assembly 120) will bias the friction drive assembly 110 toward contact and engagement with the front wheels 31 to improve the amount of friction between the friction drive assembly 110 and the front wheels 31 to enhance responsiveness and general operational effectiveness of the friction drive assembly 110.

It should be appreciated that although the pivot structure described above may be employed, other operable coupling strategies for the friction drive assembly 110 and the front wheels 31 could also be utilized in alternative embodiments. For example, a linear (horizontal or partially vertical) movement of the friction drive assembly 110 could also be provided for engagement with the front wheels 31 in some cases. The use of springs or other biasing members may be used more prominently in such designs to the extent the designs do not rely on the assistance of gravity. It should also be appreciated that, in some cases, some play between the friction drive assembly 110 and the front wheels 31 in the engaged state may be desirable. Thus, for example, the positioning assembly 120 may make strategic use of springs or other such components that can hold the friction drive assembly 110 in contact with the front wheels 31, but provide some amount of play or movement of the positioning assembly 120 (and therefore also the friction drive assembly 110) in the engaged state to accommodate some amount of movement of the friction drive assembly 110 relative to one or both of the front wheels 31 at any given time.

The actuator 130 of some embodiment may be a foot operated pedal or lever. However, in other cases, the actuator could be embodied as a hand operated lever, or other mechanical actuation device. In still other examples, the actuator 130 may be an electrically operated device or may be electromechanical. Thus, for example, the actuator may be embodied as a button or switch in some cases.

In an example embodiment, the friction drive assembly 110 may be operated by a speed controller 150 that is in turn powered by a power source 160. In some cases, the speed controller 150 may be embodied as an electric motor with a corresponding motor controller for determining speed of the turning of the friction drive assembly 110. In other examples, the speed controller 150 may be a hydraulic motor or may otherwise be powered via hydraulic fluid or hydro-statics. In such an example, the power source 160 may be a hydrostatic pump. Other power source and speed control strategies may also be employed in alternative embodiments.

In an example embodiment, the speed controller 150 may be configured to receive an input indicative of (or proportional to) the ground speed of the riding lawn care vehicle 10. This input, which may be referred to as a ground speed input 170, may be used to determine (or otherwise dictate) the speed at which the front wheels 31 are driven. For example, the friction drive assembly 110 may be powered by the speed controller 150 to turn the front wheels 31 at a rate that matches the speed over ground that is being supplied by the power provided to the rear wheels 32. In some cases, the speed controller 150 may only operate (i.e., only drive the friction drive assembly 110) when the positioning assembly 120 has been actuated to place the friction drive assembly 110 in the engaged state. However, in other cases, the speed controller 150 may turn the friction drive assembly 110 at a speed that matches the speed over ground achieved by powering of the rear wheels 32 in both the engaged and disengaged states. In such an example, the friction drive assembly 110 could essentially be driven (proportional to speed of the riding lawn care vehicle 10) without a load when disengaged.

As can be appreciated from the description above, the drive assembly 100 can be physically instantiated in a number of different ways. FIG. 4-7 illustrate one example physical structure via which the drive assembly 100 can be instantiated. In this regard, FIG. 4 is defined by FIGS. 4A and 4B, FIG. 5 is defined by FIGS. 5A and 5B, and FIG. 6 is defined by FIGS. 6A and 6B. With respect to FIGS. 4-6, it should be further noted that FIGS. 4A, 5A and 6A each show the drive assembly 100 in the disengaged state, and FIGS. 4B, 5B and 6B each show the drive assembly 100 in the engaged state.

Referring now to FIGS. 4-7, the actuator 130 of FIG. 3 may be embodied as a pedal 200. The pedal 200 may be operably coupled to a pedal mount 202. The pedal mount 202 of this example comprises to parallel plates that face each other and have slots 204 formed in a top surface thereof. The slots 204 are provided in pairs and each respective pair of slots 204 is configured to receive and retain the pedal 200 in a respective one of an engaged position (which corresponds to the forward most pair of slots 204 in this example) and a disengaged position (which corresponds to the rearward most pair of slots 204 in this example. The operator can push the pedal 200 with his/her foot (in this case the left foot, but alternatively the right if the pedal 200 is moved to the opposite side) to change between the engaged position and the disengaged position. When the pedal 200 has repositioned to alignment with the other pair of slots 204, the pedal 200 may be released by the operator and may settle into and be retained at the corresponding pair of slots 204 by the pedal mount 202.

The pedal 200 may also be operably coupled to a pedal arm 206. The pedal arm 206 may be operably coupled to the pedal 200 at a proximal end thereof (relative to the operator). The pedal arm 206 may be operably coupled to the positioning assembly 120 at the distal end of the pedal arm 206. In an example embodiment, the pedal arm 206 may be an elongate metallic member that extends between the parallel plates of the pedal mount 202, and the pedal arm 206 may be pivotally coupled to each of the pedal 200 and the positioning assembly 120.

In some cases, the pedal arm 206 may further include or be operably coupled to one or more cam surfaces or other L-shaped pivot arms that may be configured to allow rotation of the positioning assembly 120 through a pivoting or hinged range of motion when changing states of the friction drive assembly 110. As best seen in FIG. 6, a projection 207 (e.g., a catch or detent) may be provided at the end of an L-shaped pivot assembly 208 at a proximal end of the pedal arm 206 (relative to the pedal 200). Meanwhile, another L-shaped bracket 209 may be provided at the distal end of the pedal arm 206 to facilitate movement of the positioning assembly 120.

The positioning assembly 120 may include a hinge assembly 210 and a carrier plate 212. The hinge assembly 210 may include one or more butterfly hinges, butt hinges, piano hinges or other pivotal couplers that operably couple a portion of the frame 60 that is forward of the footrest 42 to the carrier plate 212. The hinge assembly 210 may define a hinge axis that extends substantially parallel to the ground and substantially perpendicular to a longitudinal centerline of the riding lawn care vehicle 10. The carrier plate 212 may therefore be operably coupled to the frame 60 at a rear portion thereof (or proximal end thereof), and the distal end of the carrier plate 212 may rise away from the ground (and away from the front wheels 310) when the carrier plate 212 pivots upward and lower toward the ground (and toward the front wheels 31) when the carrier plate 212 pivots downward.

The carrier plate 212 may be a metallic, plastic or other rigid structure either having a plate-like surface (e.g., being formed substantially of one sheet metal structure with structural supports potentially being provided around edges thereof, or at middle portions thereof. However, the carrier plate 212 need not necessarily have a plate-like surface and may instead be a collection of frame members that are arranged to form a pivotable support structure for supporting the friction drive assembly 110. Regardless of the specific structure used to embody the positioning assembly 120, the positioning assembly 120 (and in this case the carrier plate 212) may support the friction drive assembly 110, and sometimes also the speed controller 150, in the engaged state (e.g., when the pedal 200 is in the engaged (forward) position) and in the disengaged state (e.g., when pedal is in the disengaged (rearward) position). In an example embodiment, the carrier plate 212 may support or include a support tube 214 at a distal end thereof. The support tube 214 may extend parallel to the hinge axis of the hinge assembly 210.

The friction drive assembly 110 may include an axle 220 with friction wheels 222 disposed at opposing ends thereof. The friction wheels 222 may be knurled metallic, plastic or other rigid members that are configured to frictionally engage with the front wheels 31 when the friction drive assembly 110 is in the engaged state. The friction wheels 222 may be operably coupled to and turn with the axle 220. In some cases, the axle 220 may be supported within the support tube 214 such that the axle 220 can turn within support tube 214 with relatively little friction. As such, a bearing assembly may be provided within the support tube 214 to enable relatively free rotation of the axle 220 within the support tube 214 when the speed controller 150 turns the axle 220.

In this regard, the speed controller 150 of this example is embodied as an electric motor 230. The electric motor 230 is supported on the carrier plate 212 and operably coupled to the axle 220 via a belt 232 (or a chain or other flexible drive member). The belt 232 may extend from a drive wheel attached to an output shaft of the electric motor 230 to a power wheel 236 mounted directly on the axle 220 to turn the axle 220 responsive to turning of the output shaft of the electric motor 230. In some cases, the drive wheel on the output shaft of the electric motor 230 may have a smaller diameter than the power wheel 236 to increase the speed of the axle 220 relative to the speed of the output shaft. The sizes of these wheels in relation to the sizes of the front wheels 31 may be selected to enable the ground speed of the rear wheels 30 to be matched relatively accurately when the friction drive assembly 110 is in the engaged state.

The electric motor 230 may therefore determine the speed (e.g., in revolutions per minute (RPM)) of the output shaft of the electric motor 230 based on the speed over ground being provided by the powering of the rear wheels 30. The electric motor 230 may therefore be understood to have the potential for variable speed control based on and matching the speed of the riding lawn care vehicle 10. As noted above, in some cases, the electric motor 230 could be replaced with a hydraulic motor, and hydraulic lines (e.g., instead of electrical wiring) may be used to operably couple the hydraulic motor to the power source 160 (which would then be hydraulic instead of electrical).

When the pedal 200 is moved to the disengaged position (shown in FIGS. 4A, 5A and 6A), the pedal 200 may be drawn in the direction of arrow 240, and the pedal arm 206 may lift carrier plate 212 upward as shown by arrow 242. The pedal 200 may be received in the slots 204 (i.e., the rearward-most slots) that correspond to the disengaged position on the pedal mount 202. In some cases, a set of carrier assist springs 244 may be positioned between the frame 60 and the support tube 214 (or a portion of the carrier plate 212) to assist in lifting the carrier plate 212 against the force of gravity. As such, lifting the carrier plate 212 unloads the carrier assist springs 244, whereas lowering the carrier plate 212 loads the carrier assist springs 244.

The pedal 200 and/or the pedal arm 206 may also include one or more assisting springs 246 that may be positioned to bias the pedal 200 toward the disengaged position. In this regard, for example, as shown in FIG. 6, the assist spring 246 may extend between a distal end of the pedal arm 206 and a proximal end (or top) portion of the carrier plate 212. The lifting of the carrier plate 212 loads the assist spring 246, and the lower of the carrier plate 212 unloads the assist spring 246. The lifting of the carrier plate 212 also lifts the support tube 214, the axle 220 and the friction wheels 222 so that the friction wheels 222 are no longer in contact with the front wheels 31 and the friction drive assembly 110 is in the disengaged state. When the friction drive assembly 110 is in the disengaged state, the front wheels 31 are free to rotate unpowered about the wheel axis, and also free to rotate about the spindle axis.

When the pedal 200 is moved to the engaged position (shown in FIGS. 4B, 5B and 6B), the pedal 200 may be pushed in the direction of arrow 250, and the pedal arm 206 may push the carrier plate 212 (against the biasing of the carrier assist springs 244) downward as shown by arrow 252. The pedal 200 may be received in the slots 204 (i.e., the forward-most slots) that correspond to the engaged position on the pedal mount 202. The pushing of the carrier plate 212 lowers (assisted by gravity) the support tube 214, the axle 220 and the friction wheels 222 downward so that the friction wheels 222 are forced into contact with the front wheels 31 and the friction drive assembly 110 is in the engaged state.

When the friction drive assembly 110 is in the engaged state, there are two distinct impacts on the front wheels 31. First, the front wheels 31 are no longer free to rotate unpowered about the wheel axis. Instead, the front wheels 31 are held (through friction with the friction wheels 222) to tend to move at the speed dictated by the movement of the friction wheels 222. Thus, if the friction wheels 222 are being driven (by the electric motor 230) to achieve the same speed over ground that is being provided at the rear wheels 30, then the front wheels 31 will also be driven at the same speed. Conversely, if the friction wheels 222 are not powered, then the friction wheels 222 will not only be inclined not to move, but the friction wheels 222 will effectively act as a brake on the front wheels 31 by applying friction that resists rotation of the front wheels 31 about the wheel axis.

Second, the front wheels 31 are also no longer free to rotate about the spindle axis. Instead, when the friction wheels 222 engage the front wheels 31, the front wheels 31 will generally be aligned straight ahead (e.g., so the wheel axis is substantially perpendicular to the longitudinal centerline of the riding lawn care vehicle 10). This generally prevents the front wheels 31 from becoming unstable on slopes or when going up or down hills and keeps the front wheels 31 pointing relatively straight and in alignment with the rear wheels 30. Of note, the existence of the carrier assist springs 244 and the assisting springs 246 may provide for some amount of play in the carrier plate 212 (or more generally in the positioning assembly 120). This play may allow the front wheels 31 to rotate slightly about the spindle axis (e.g., up to ten degrees in either direction). Of note, in some cases, edges of the carrier plate 212 or the support tube 214 may be extended outwardly toward the front wheels 31 to further limit rotation thereof about the spindle axis. In particular, a gap between either the carrier plate 212 or the support tube 214 may help to define the maximum amount of play or rotation of the front wheels 31 that is allowed in the engaged state.

Accordingly, some example embodiments may provide a riding lawn care vehicle. The riding lawn care vehicle may include a frame, a steering assembly, caster wheels and a drive assembly. At least a first drive wheel and a second drive wheel of the riding lawn care vehicle are attachable to the frame. The steering assembly is configured to facilitate turning of the riding lawn care vehicle based on drive speed control of the first and second drive wheels. The caster wheels are configured to support unpowered rotation about a wheel axis that extends substantially parallel to the ground and rotation about a spindle axis that is substantially perpendicular to the ground. The drive assembly is configured to be selectively placed in a disengaged state in which rotation about the spindle axis and the wheel axis is uninhibited, and an engaged state in which the caster wheels are at least partially inhibited with respect to rotation about both the wheel axis and the spindle axis.

The riding lawn care vehicle (or the drive assembly) of some embodiments may include additional, optional features, and/or the features described above may be modified or augmented. Some examples of modifications, optional features and augmentations are described below. It should be appreciated that the modifications, optional features and augmentations listed below may each be added alone, or they may be added cumulatively in any desirable combination. For example, in some embodiments, the drive assembly may include a friction drive assembly that contacts the caster wheels in the engaged state and does not contact the caster wheels in the disengaged state. In an example embodiment, the friction drive assembly may be configured to enable a power source to provide power to the caster wheels via frictional engagement between the caster wheels and the friction drive assembly in the engaged state. In some cases, the friction drive assembly may include an axle and friction wheels provided at opposing ends of the axle, and the friction wheels may inhibit rotation of the caster wheels about the spindle axis in the engaged state. In an example embodiment, the friction drive assembly may include a motor having an output shaft that may be operably coupled to the axle to turn the axle at a speed proportional to speed over ground provided by the first and second drive wheels. In some cases, the motor may be an electric motor or a hydraulic motor. In an example embodiment, the motor may be supported on a carrier plate that may be configured to pivot between the engaged state and the disengaged state. In some cases, the carrier plate may include a support tube inside which the axle is rotatably mounted, and one or more carrier assist springs may be provided to extend between the frame and the support tube to facilitate lifting the carrier plate to the disengaged state. In an example embodiment, the output shaft may include a drive wheel and the axle comprises a power wheel, and sizes of the drive wheel and the power wheel may be selected to enable the motor to drive the axle proportional to the speed over ground provided by the first and second drive wheels. In some cases, the caster wheels may include a first caster wheel and a second caster wheel, and the first and second caster wheels may be disposed at a front portion of the riding lawn care vehicle. The friction wheels may simultaneously engage the first caster wheel and the second caster wheel when the friction drive assembly is in the engaged position. In an example embodiment, the riding lawn care vehicle may further include an actuator configured to shift the drive assembly between the engaged state and the disengaged state. In some cases, the actuator may include a foot-operated pedal. In an example embodiment, the riding lawn care vehicle may be a zero turn mower.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A riding lawn care vehicle comprising:
   a frame to which at least a first drive wheel and a second drive wheel of the riding lawn care vehicle are attachable;
   a steering assembly configured to facilitate turning of the riding lawn care vehicle based on drive speed control of the first and second drive wheels;
   caster wheels configured to support unpowered rotation about a wheel axis that extends substantially parallel to the ground and rotation about a spindle axis that is substantially perpendicular to the ground; and
   a drive assembly configured to be selectively placed in a disengaged state in which rotation about the spindle axis and the wheel axis is uninhibited, and an engaged state in which caster wheels are at least partially inhibited with respect to rotation about both the wheel axis and the spindle axis,
   wherein the drive assembly comprises a friction drive assembly that contacts the caster wheels in the engaged state and does not contact the caster wheels in the disengaged state,
   wherein in the engaged state, the friction drive assembly contacts the caster wheels at respective contact points disposed forward of the wheel axis and at an opposite side of the wheel axis from the first and second drive wheels, and
   wherein the drive assembly inhibits rotation about the wheel axis and spindle axis so the wheel axis is substantially perpendicular to the longitudinal centerline of the riding lawn care vehicle in response to the friction drive assembly not being powered in the engaged state.

2. The riding lawn care vehicle of claim 1, further comprising an actuator configured to shift the drive assembly between the engaged state and the disengaged state, and wherein the actuator comprises a foot-operated pedal.

3. The riding lawn care vehicle of claim 1, wherein the friction drive assembly is configured to enable a power source to provide power to the caster wheels via frictional engagement between the caster wheels and the friction drive assembly in the engaged state.

4. The riding lawn care vehicle of claim 3, wherein the friction drive assembly comprises an axle and friction wheels provided at opposing ends of the axle, and
   wherein the friction wheels inhibit rotation of the caster wheels about the spindle axis in the engaged state.

5. The riding lawn care vehicle of claim 4, wherein the friction drive assembly comprises a motor having an output shaft operably coupled to the axle to turn the axle at a speed proportional to speed over ground provided by the first and second drive wheels.

6. The riding lawn care vehicle of claim 5, wherein the motor is an electric motor or a hydraulic motor.

7. The riding lawn care vehicle of claim 5, wherein the motor is supported on a carrier plate, the carrier plate being configured to pivot between the engaged state and the disengaged state.

8. The riding lawn care vehicle of claim 7, wherein the carrier plate comprises a support tube inside which the axle is rotatably mounted, and
   wherein one or more carrier assist springs is provided to extend between the frame and the support tube to facilitate lifting the carrier plate to the disengaged state.

9. The riding lawn care vehicle claim 1, wherein the riding lawn care vehicle is a zero turn mower.

10. The riding lawn care vehicle of claim 4, wherein the caster wheels comprise a first caster wheel and a second caster wheel, the first and second caster wheels being disposed at a front portion of the riding lawn care vehicle, and wherein the friction wheels simultaneously engage the first caster wheel and the second caster wheel when the friction drive assembly is in the engaged position.

11. A riding lawn care vehicle comprising:

a frame to which at least a first drive wheel and a second drive wheel of the riding lawn care vehicle are attachable;

a steering assembly configured to facilitate turning of the riding lawn care vehicle based on drive speed control of the first and second drive wheels;

caster wheels configured to support unpowered rotation about a wheel axis that extends substantially parallel to the ground and rotation about a spindle axis that is substantially perpendicular to the ground; and a drive assembly configured to be selectively placed in a disengaged state in which rotation about the spindle axis and the wheel axis is uninhibited, and an engaged state in which caster wheels are at least partially inhibited with respect to rotation about both the wheel axis and the spindle axis, wherein the drive assembly comprises a friction drive assembly that contacts the caster wheels in the engaged state and does not contact the caster wheels in the disengaged state, wherein in the engaged state, the friction drive assembly contacts the caster wheels at respective contact points disposed forward of the wheel axis and at an opposite side of the wheel axis from the first and second drive wheels, wherein the friction drive assembly comprises a motor having an output shaft operably coupled to the axle to turn the axle at a speed proportional to speed over ground provided by the first and second drive wheels, wherein the friction drive assembly comprises an axle and friction wheels provided at opposing ends of the axle, wherein the friction wheels inhibit rotation of the caster wheels about the spindle axis in the engaged state wherein the friction drive assembly is configured to enable a power source to provide power to the caster wheels via frictional engagement between the caster wheels and the friction drive assembly in the engaged state, wherein the output shaft comprises a drive wheel and the axle comprises a power wheel, and wherein sizes of the drive wheel and the power wheel are selected to enable the motor to drive the axle proportional to the speed over ground provided by the first and second drive wheels.

12. A drive assembly of a riding lawn care vehicle including caster wheels, wherein the riding lawn care vehicle comprises first and second drive wheels operably coupled to a frame, wherein the riding lawn care vehicle further comprises a steering assembly configured to facilitate turning of the riding lawn care vehicle based on drive speed control of the first and second drive wheels, and wherein the caster wheels are configured to support unpowered rotation about a wheel axis that extends substantially parallel to the ground and rotation about a spindle axis that is substantially perpendicular to the ground, the drive assembly comprising:

a friction drive assembly configured to be selectively placed in a disengaged state in which rotation about the spindle axis and the wheel axis is uninhibited, and an engaged state in which the caster wheels are at least partially inhibited with respect to rotation about both the wheel axis and the spindle axis, wherein the friction drive assembly contacts the caster wheels in the engaged state and does not contact the caster wheels in the disengaged state, wherein in the engaged state, the friction drive assembly contacts the caster wheels at respective contact points disposed forward of the wheel axis and at an opposite side of the wheel axis from the first and second drive wheels, and wherein the friction drive assembly inhibits rotation about the wheel axis and spindle axis so the wheel axis is substantially perpendicular to the longitudinal centerline of the riding lawn care vehicle in response to the friction drive assembly not being powered in the engaged state.

13. The drive assembly of claim 12, wherein the friction drive assembly is configured to enable a power source to provide power to the caster wheels via frictional engagement between the caster wheels and the friction drive assembly in the engaged state.

14. The drive assembly of claim 13, wherein the friction drive assembly comprises an axle and friction wheels provided at opposing ends of the axle, and wherein the friction wheels inhibit rotation of the caster wheels about the spindle axis in the engaged state.

15. The drive assembly of claim 14, wherein the friction drive assembly comprises a motor having an output shaft operably coupled to the axle to turn the axle at a speed proportional to speed over ground provided by the first and second drive wheels.

16. The drive assembly of claim 15, wherein the motor is an electric motor or a hydraulic motor, wherein the motor is supported on a carrier plate, the carrier plate being configured to pivot between the engaged state and the disengaged state, wherein the carrier plate comprises a support tube inside which the axle is rotatably mounted, and wherein one or more carrier assist springs is provided to extend between the frame and the support tube to facilitate lifting the carrier plate to the disengaged state.

17. The drive assembly of claim 15, wherein the output shaft comprises a drive wheel and the axle comprises a power wheel, and wherein sizes of the drive wheel and the power wheel are selected to enable the motor to drive the axle proportional to the speed over ground provided by the first and second drive wheels, wherein the caster wheels comprise a first caster wheel and a second caster wheel, the first and second caster wheels being disposed at a front portion of the riding lawn care vehicle, and wherein the friction wheels simultaneously engage the first caster wheel and the second caster wheel when the friction drive assembly is in the engaged position.

\* \* \* \* \*